(12) United States Patent
Park et al.

(10) Patent No.: US 6,707,520 B2
(45) Date of Patent: Mar. 16, 2004

(54) METHOD OF FABRICATING LIQUID CRYSTAL DISPLAY

(75) Inventors: Ku Hyun Park, Anyang-shi (KR); Hyeon Ho Son, Anyang-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 91 days.

(21) Appl. No.: 09/888,506

(22) Filed: Jun. 26, 2001

(65) Prior Publication Data

US 2002/0036737 A1 Mar. 28, 2002

(30) Foreign Application Priority Data

Jul. 31, 2000 (KR) ........................................ 2000-44442

(51) Int. Cl.$^7$ ................................................. G02F 1/13
(52) U.S. Cl. ....................................................... 349/129
(58) Field of Search .......................................... 349/129

(56) References Cited

U.S. PATENT DOCUMENTS 6,313,898 B1 * 11/2001 Numano et al. ............. 349/129
6,323,926 B2 * 11/2001 Watanabe et al. ........... 349/130

OTHER PUBLICATIONS

T. Miyashita et al., "Wide Viewing Angle Display Mode For Active Matrix LCD Using Bend Alignment Liquid Crystal Cell", The 13th International Display Research Conference, Aug. 31–Sep. 3, 1993, Strasbourg–France, pp. 149–152.
Hirouki Mori, "A Wide–Viewing–Angle π Cell Compensated With A Discotic Film", IEICE Trans. Electron, vol. E82–C, No. 10, Oct. 10, 1999, pp. 1787–1791.

* cited by examiner

Primary Examiner—James Dudek
(74) Attorney, Agent, or Firm—Morgan, Lewis & Bockius LLP

(57) ABSTRACT

A method of fabricating a liquid crystal display capable of arranging a liquid crystal injected within a liquid crystal display panel into a stable bend structure within a short time. The liquid crystal display includes a non-display area and a display area. In the method, alignment films positioned at the non-display area and at the display area undergo a rubbing treatment. The non-display area is exposed to light to adjust a pre-tilt angle of a liquid crystal included in each of the non-display area and the display area. Accordingly, the liquid crystal within the black matrix area is arranged at a large pre-tilt angle upon initialization of the liquid crystal display device, so that a bend structure can be obtained in a fast and stable manner.

24 Claims, 11 Drawing Sheets

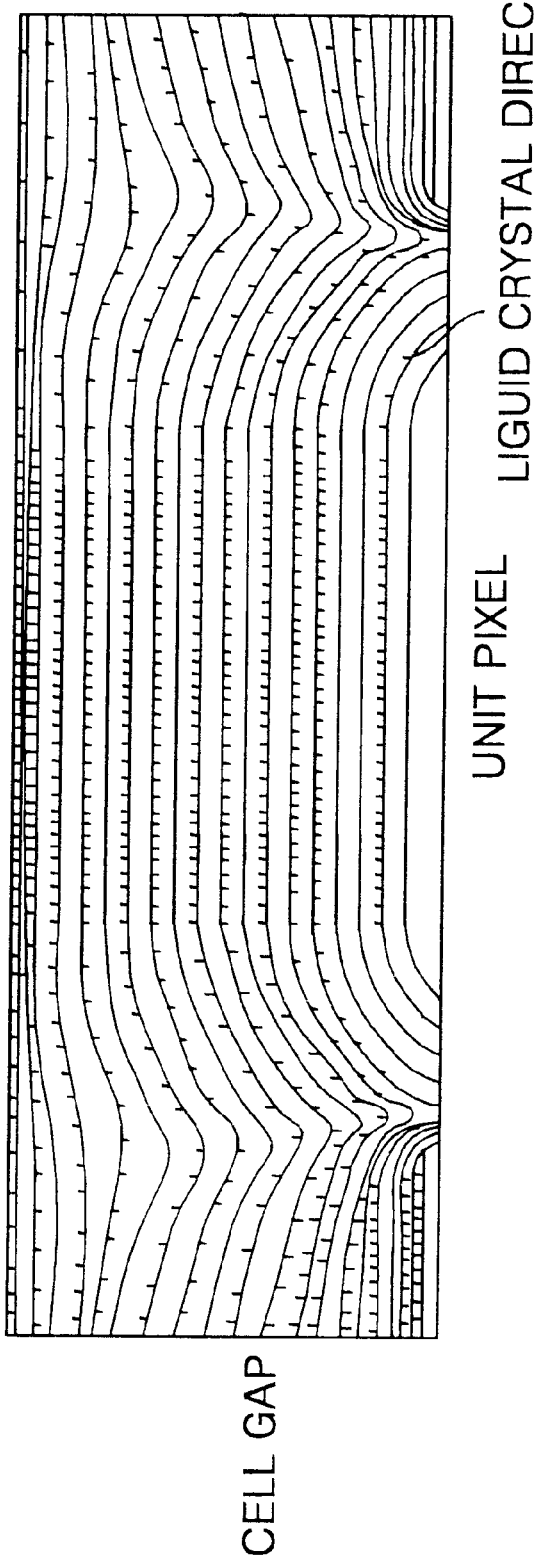

METHOD OF FABRICATING LIQUID CRYSTAL DISPLAY

This application claims the benefit of Korean Application Number P00-44442, filed Jul. 31, 2000, which is hereby incorporated by reference.

BACKGROUND OF THE INVENTION

1. Field of the Invention

This invention relates to a liquid crystal display, and more particularly to a method of fabricating a liquid crystal display capable of forming a bend structure of a liquid crystal in a fast and stable manner.

2. Description of the Related Art

Generally, a liquid crystal display (LCD) includes switching devices consisting of thin film transistors having gate electrodes, a gate insulating film, an active layer, an ohmic contact layer and source and drain electrodes, and a liquid crystal injected between a lower plate provided with pixel electrodes and an upper plate provided with color filters.

FIG. 1 is a plan view showing a structure of a conventional LCD, and FIG. 2 is a sectional view taken along the A—A' line in FIG. 1.

Referring to FIG. 1 and FIG. 2, in the conventional LCD, a gate electrode 5 made from a metal such as aluminum (Al) or copper (Cu) is formed on a lower substrate 1 in such a manner to be connected to a gate line 3. A gate insulating film 15 is formed on the transparent substrate 1 to cover the gate electrode 5 and the gate line 3. The gate insulating film 15 is made from silicon nitride or silicon oxide.

An active layer 6 and an ohmic contact layer 7 are provided at a portion corresponding to the gate electrode 5 on the gate insulating film 15. The active layer 6 is formed from amorphous silicon or polycrystalline silicon undoped with an impurity. The ohmic contact layer 7 is made from amorphous silicon or polycrystalline silicon doped with an n-type or p-type impurity at a high concentration.

Source and drain electrodes 13 and 11 are formed at each side of the active layer 6 on the gate insulating film 15 in such a manner to contact the ohmic contact layer 7. The source and drain electrodes 13 and 11 are made from a metal such as molybdenum (Mo), chrome (Cr), titanium (Ti) or tantalum (Ta), etc., or a molybdenum alloy such as MoW, MoTa or MoNb, etc. The source electrode 13 is connected to a data line 2, and the drain electrode 11 opposes the source electrode 13 with the gate electrode 5 in between. A thin film transistor is constituted by the gate electrode 5, the gate insulating film 15, the active layer 6 and the source and drain electrodes 13 and 11 as described above. A passivation layer 9 is formed on the gate insulating film 15 to cover the thin film transistor. The passivation layer 9 is made from an inorganic insulating material such as silicon nitride or silicon oxide, etc. A contact hole 19 for exposing the drain electrode 11 is defined at the passivation layer 9. A pixel electrode 17 contacting the drain electrode 11 via the contact hole 19 is formed on the passivation layer 9. The pixel electrode 17 is formed from a transparent conductive material such as indium tin oxide (ITO), tin oxide (TO) or indium zinc oxide (IZO) at an area excluding a portion corresponding to the thin film transistor on the passivation layer 9. A storage electrode (not shown) provided at an overlapping portion between the pixel electrode 17 at the next stage and the gate line 3 constitutes a storage capacitor along with the gate line 3 intervening with the gate insulating film 15.

Meanwhile, an upper substrate 21 of the LCD is provided with a plurality of color filters 25 for transmitting desired color, a black matrix 23 for shutting such light transmission, and a common electrode 26 for applying a voltage to the liquid crystal. The color filters 25 are formed to correspond to a pixel area of the lower substrate 1 while the black matrix 23 is formed to correspond to an area excluding the pixel area.

The upper substrate and the lower substrate formed in this manner are joined with each other, and a liquid crystal is injected therebetween. The liquid crystal injected between the upper substrate and the lower substrate is arranged as shown in FIG. 3A and FIG. 3B by an aligned state of an alignment film and an external voltage.

Referring to FIG. 3A, a liquid crystal 32 injected into a space between the upper substrate 21 and the lower substrate 1 is arranged within said space in a splay structure. The splay structure has a desired pre-tilt depending on an aligned state of alignment films 27 formed on the upper substrate 21 and the lower substrate 1. When a desired voltage V is applied to molecules of the liquid crystal 32 arranged in such a splay structure, the liquid crystal 32 is re-arranged as shown in FIG. 3B. In other words, when a desired voltage is applied to the common electrode 26 and the pixel electrode 17, the liquid crystal 32 primarily arranged in a splay structure is re-arranged into a bend structure. At this time, the liquid crystal 32 injected within a pixel area between the common electrode 26 and the pixel electrode 17 is liable to re-arrangement into a bend structure having a large pre-tilt, by a desired voltage applied from the common electrode 26 and the pixel electrode 17. However, the liquid crystal 32 injected within the black matrix area 23 and the pixel electrode 17, keeps the splay structure as is. The liquid crystal 32 arranged in a splay structure within the black matrix area 23 has a more stable state than the liquid crystal 32 arranged in a bend structure within the pixel area. For this reason, the liquid crystal 32 arranged in a bend structure, adjacent to the liquid crystal 32 arranged in a splay structure, is liable to change into a splay structure. Also, formation of a liquid crystal having the bend structure at the entire LCD panel not only requires lot of time, but also results in a failure of a uniform liquid crystal arrangement at the entire LCD panel.

SUMMARY OF THE INVENTION

Accordingly, it is an object of the present invention to provide a method of fabricating a liquid crystal display, capable of arranging a liquid crystal injected within a liquid crystal display panel, into a stable bend structure within a short time.

In order to achieve these and other objects of the invention, a method of fabricating a liquid crystal display device according to the present invention includes the steps of rubbing alignment films positioned at a non-display area and a display area, and exposing the non-display area to the light to adjust a pre-tilt angle of a liquid crystal included in each of the non-display area and the display area.

The method further includes the steps of arranging a photo mask on the alignment film within the display area excluding the alignment film within the non-display area, and exposing the display area and the non-display area to the light through the photo mask. The liquid crystal included in the non-display area has a larger pre-tilt angle than the liquid crystal included in the display area.

BRIEF DESCRIPTION OF THE DRAWINGS

These and other objects of the invention will be apparent from the following detailed description of the embodiments of the present invention with reference to the accompanying drawings, in which:

FIG. 7 is a view showing a simulation data for the liquid crystal display device according to an embodiment of the present invention.

DETAILED DESCRIPTION OF THE PREFERRED EMBODIMENT

Figure 4A:
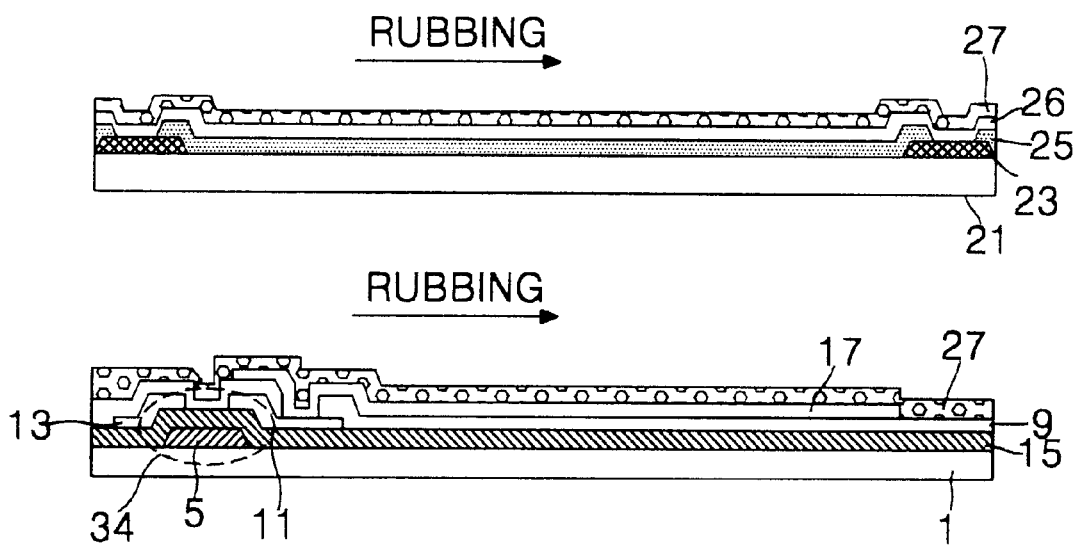
FIG. 4A and FIG. 4B are sectional views representing a method of fabricating a liquid crystal display device according to a first embodiment of the present invention.
Figure 4B:
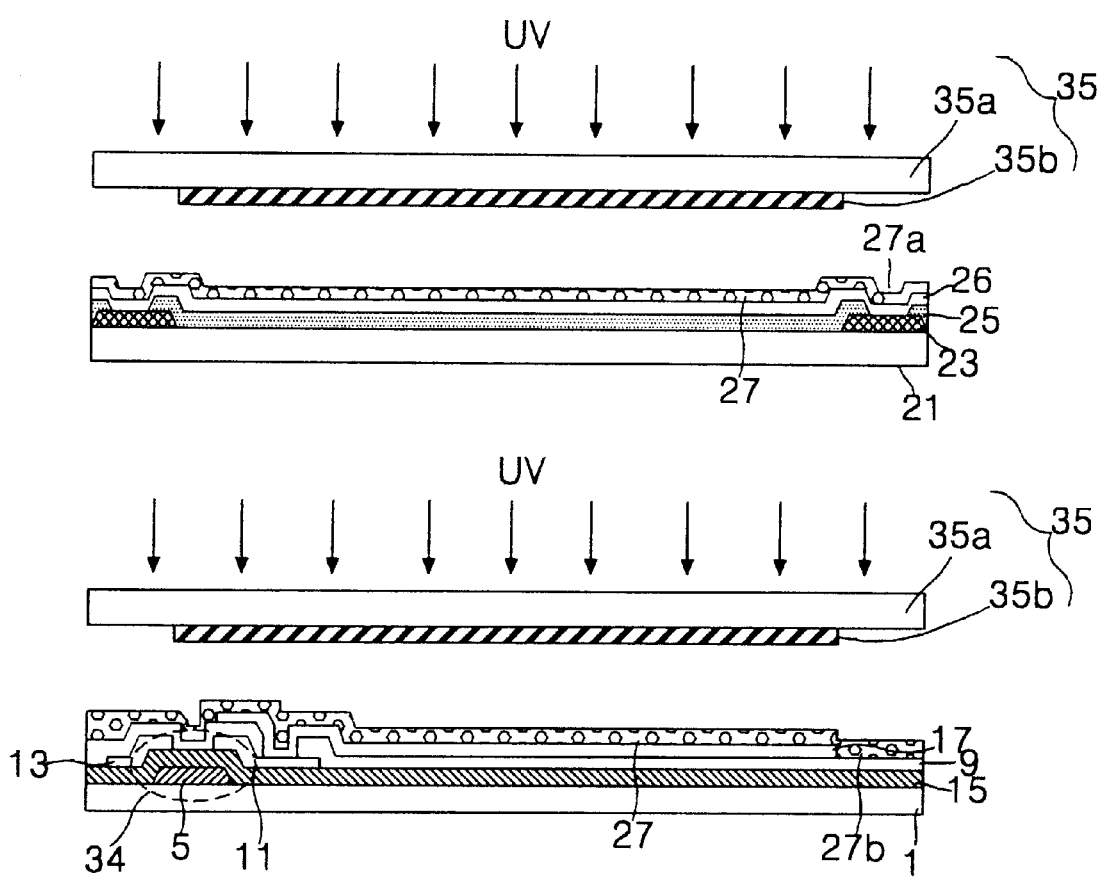

FIG. 4A and FIG. 4B illustrate a method of fabricating a liquid crystal display device according to a first embodiment of the present invention.

Referring to FIG. 4A, an alignment film 27 is formed on an upper substrate 21 sequentially provided with a black matrix 23, color filters 25 and a common electrode 26. The alignment film 27 formed on the upper substrate 21 has a desired alignment state by a rubbing. Furthermore, an alignment film 27 is also formed on a lower substrate 1 provided sequentially with a thin film transistor 34 and a pixel electrode 17. Likewise, the alignment film 27 formed on the lower substrate 1 has a desired alignment state by a rubbing. A material that can be aligned by a rubbing and a photo-alignment method using an ultraviolet ray (UV) is used for the alignment film 27.

Photo mask 35 are arranged at the upper portions of the upper substrate 21 and at the lower substrate 1 provided with the alignment film 27. The photo masks are arranged in such a manner as to be spaced at a certain distance from the alignment film 27. Each of the photo masks 35, provided at the upper substrate 21 and at the lower substrate 1, include a photo mask substrate 35a and an opaque metal 35b, wherein the opaque metal 35b is formed at a desired portion of the photo mask substrate 35a. The photo mask 35 is aligned with the upper substrate 21 or the lower substrate 1, such that the opaque metal area 35b corresponds to a pixel area provided within the upper substrate 21 and the lower substrate 1. An ultraviolet ray (UV) is irradiated onto the upper substrate 21 and onto the lower substrate 1 arranged with the photo mask 35. The UV ray irradiated onto the upper substrate 21 and onto the lower substrate 1 transmits onto the alignment film 27a formed within the black matrix area 23, and onto the alignment film 27b, whereas it fails to transmit onto the alignment film 27 formed within the pixel areas. For this reason, an alignment state of the alignment film 27a formed within the black matrix area 23 becomes different than the alignment state of the alignment film 27 formed within the pixel area. Also, an alignment film 27b of the lower substrate 1 formed within an area corresponding to the black matrix area 23 has an alignment state different from the alignment state of the alignment film 27 within the pixel area. These alignment films 27a and 27b act as a seed of the bend structure upon driving of the liquid crystal cell to stabilize the bend structure. In other words, the alignment film 27a onto which the UV is irradiated has a larger pre-tilt angle than the alignment film 27 onto which the UV is not irradiated. Finally, the upper substrate 21 and the lower substrate 1 formed in this manner are correspondingly joined with each other, and then a liquid crystal is injected therebetween.

Figure 5A:
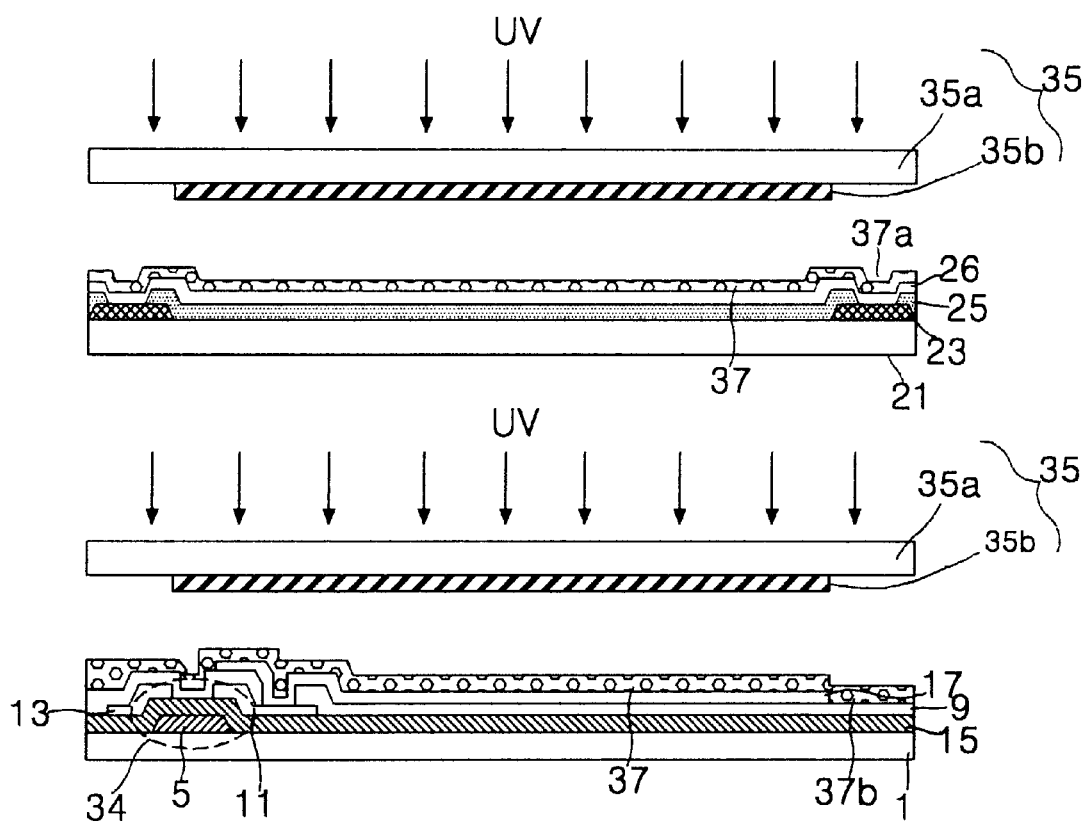
FIG. 5A and FIG. 5B are sectional views representing a method of fabricating a liquid crystal display device according to a second embodiment of the present invention step by step.
Figure 5B:
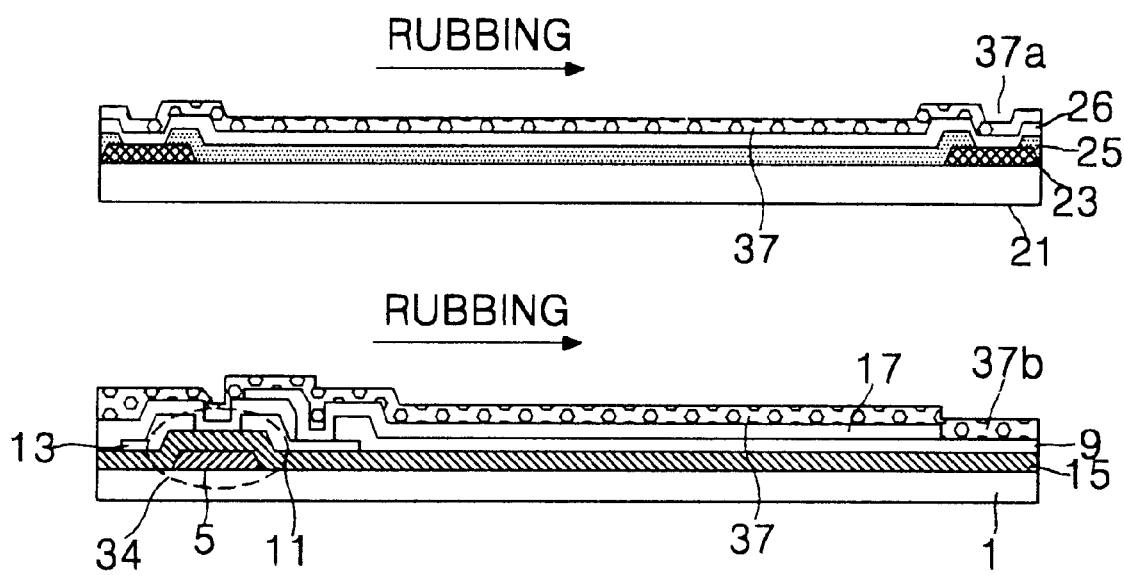

FIG. 5A and FIG. 5B illustrate a method of fabricating a liquid crystal display device according to a second embodiment of the present invention.

Referring to FIG. 5A, alignment film 37 are formed on an upper substrate 21 provided with a black matrix 23, color filters 25 and a common electrode 26 and a lower substrate 1 provided with a thin film transistor 34 and a pixel electrode 17. A material that can be aligned by a rubbing and a photo-alignment method using an ultraviolet ray (UV) is used for the alignment film 37.

Photo mask 35 are arranged at the upper portions of the upper substrate 21 and the lower substrate 1 spaced at a certain distance from the alignment film 37. Each of the photo masks 35 provided at the upper portions of the upper substrate 21 and the lower substrate 1 includes a photo mask substrate 35a and an opaque metal 35b formed at a desired portion of the photo mask substrate 35a. The photo mask 35 is aligned with the upper substrate 21 or the lower substrate 1 such that the opaque metal area 35b corresponds to a pixel area provided within the upper substrate 21 and the lower substrate 1. An ultraviolet ray (UV) is irradiated onto the upper substrate 21 and the lower substrate 1 arranged with the photo mask 35. The UV irradiated onto the upper substrate 21 and onto the lower substrate 1 transmits through the photo mask substrate 35a onto an alignment film 37a formed within the black matrix area 23, and onto the alignment film 37b. Whereas the UV irradiated onto the upper substrate 21 and onto the lower substrate 1, fails to transmit through the opaque metal 35b and onto the alignment film 37 formed within the pixel areas. Thereafter, the alignment film 37 formed on the upper substrate 21 and the lower substrate 1 undergo a rubbing treatment. For this reason, an alignment state of the alignment film 37a formed within the black matrix area 23 becomes different from that of the alignment film 37 within the pixel area onto which the UV has not been irradiated. Also, an alignment film 37b of the lower substrate 1 formed within an area corresponding to the black matrix area 23 has an alignment state different from the alignment film 37 within the pixel area. In other words, the alignment film 37a and 37b onto which the UV is irradiated have a larger pre-tilt angle than the alignment film 37 onto which the UV is not irradiated. Finally, the upper substrate 21 and the lower substrate 1 formed in this manner are correspondingly joined with each other, and then a liquid crystal is injected therebetween.

Figure 6A:
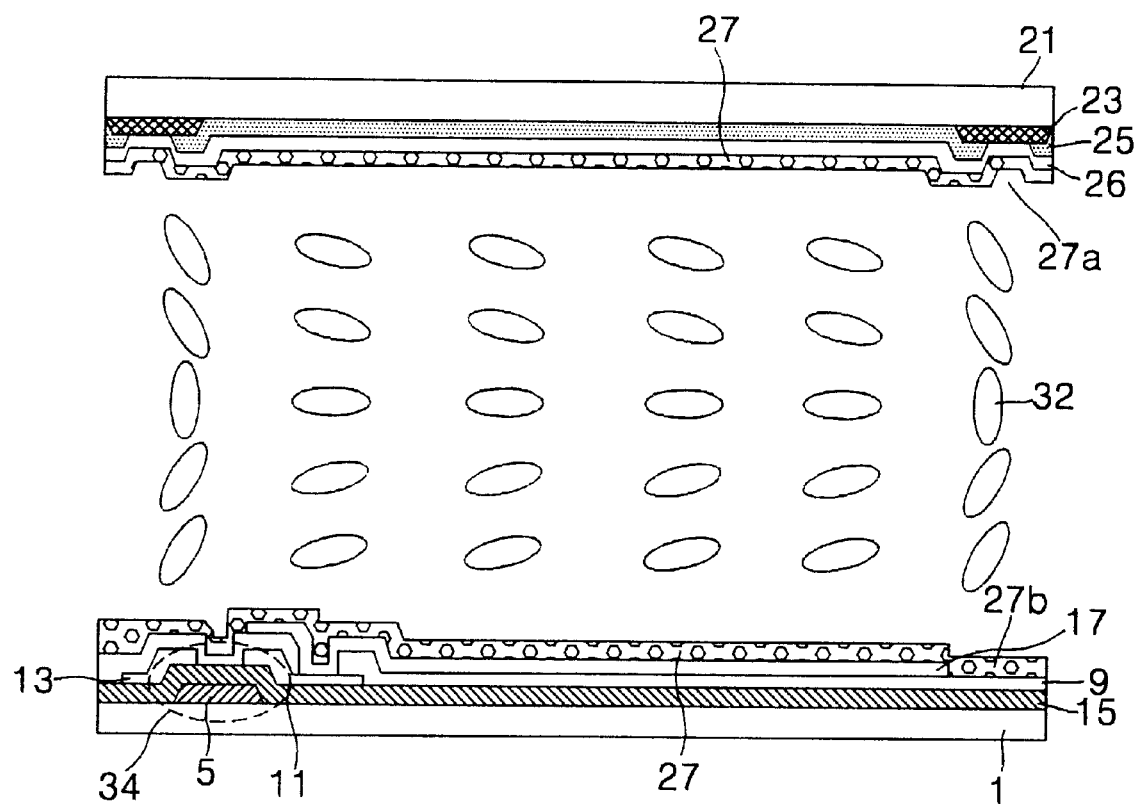
FIG. 6A and FIG. 6B are sectional views representing a liquid crystal state according to an embodiment of the present invention.
Figure 6B:
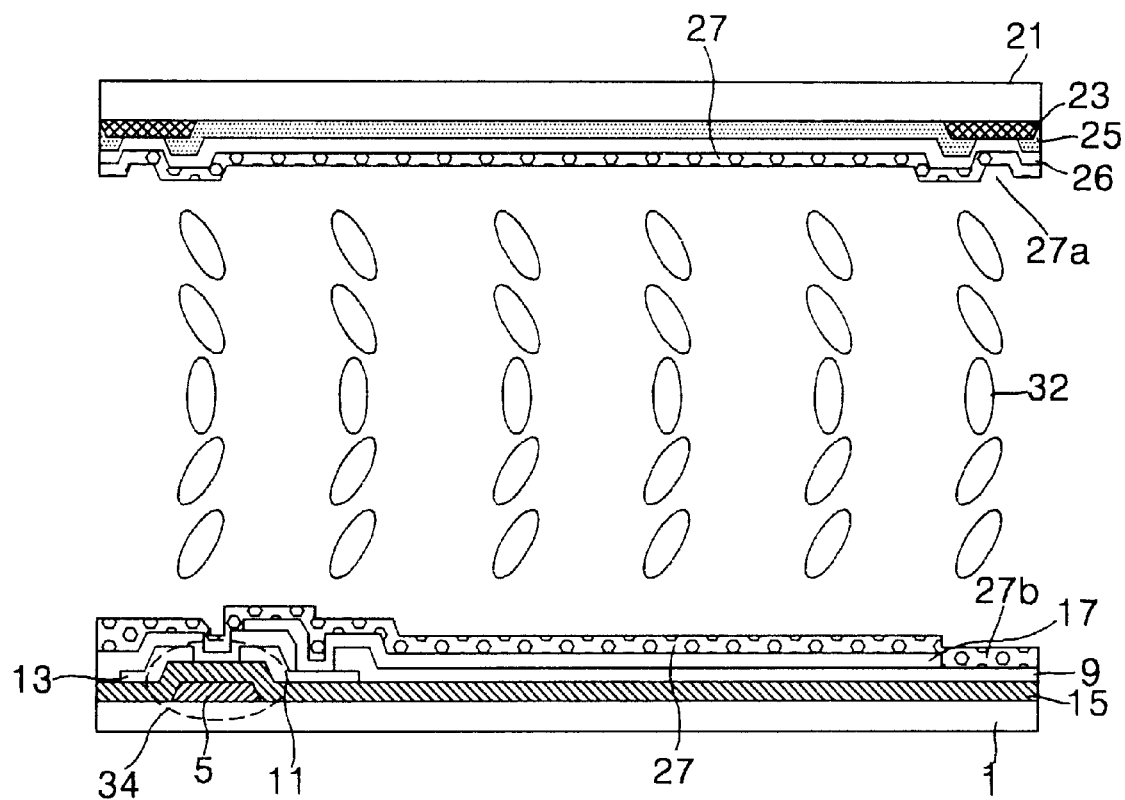

FIG. 6A and FIG. 6B illustrate a state of the LCD panel when changing a characteristic of the alignment film formed within the black matrix area by the alignment method using a rubbing and a photo-alignment method. FIG. 6A and 6B also show joining the upper substrate with the lower substrate, and thereafter injecting a liquid crystal therebetween according with the above-mentioned embodiments.

As shown in FIG. 6A, an alignment state at the pixel area of a liquid crystal 32 injected into a space between the upper substrate 21 and the lower substrate 1 is different from an alignment state at the black matrix area 23 thereof. This is because the alignment film 27 within the pixel area has an alignment state different from the alignment film 27a within the black matrix area 23. In other words, the alignment film 27a within the black matrix area 23 is aligned to have a larger pre-tilt angle than the alignment film 27 within the pixel area by a rubbing and an ultraviolet ray. Accordingly, upon injection of the liquid crystal 32, the liquid crystal 32 injected within the black matrix area 23 has a larger pre-tilt angle (i.e., above 50 degrees at the surface thereof) than the liquid crystal 32 having been injected within the pixel area.

Meanwhile, as shown in FIG. 6B, the liquid crystal 32 within the black matrix area 23 re-arranged into a splay structure having a large pre-tilt angle has a more stable state than the liquid crystal 32 within the pixel area having a relatively small pre-tilt angle. For this reason, the liquid crystal 32 within the pixel area adjacent to the liquid crystal 32 arranged at a large pre-tilt angle within the black matrix area 23 is re-arranged to have a large pre-tilt angle. In other words, since the liquid crystal 32 existing within the pixel area has more unstable state than the liquid crystal 32 existing within the black matrix area 23, it shows a changing property into the liquid crystal existing within the black matrix area 23. Accordingly, the liquid crystal 32 within the pixel area which is adjacent to the liquid crystal 32 existing within the black matrix area 23 begins to change into a stable state and the remaining liquid crystal 32 is gradually changed into a stable state. Ultimately, all the liquid crystal 32 within the pixel area becomes stable by such a gradual state change.

FIG. 7 shows a unit pixel of the liquid crystal display device depicted by simulation data values measured when the liquid crystal within the black matrix area has been aligned at a pre-tilt angle larger than liquid crystal within the pixel area by about 40 degrees. Each portion indicated by the dotted lines in FIG. 7 represents a direction of the liquid crystal.

Figure 1:
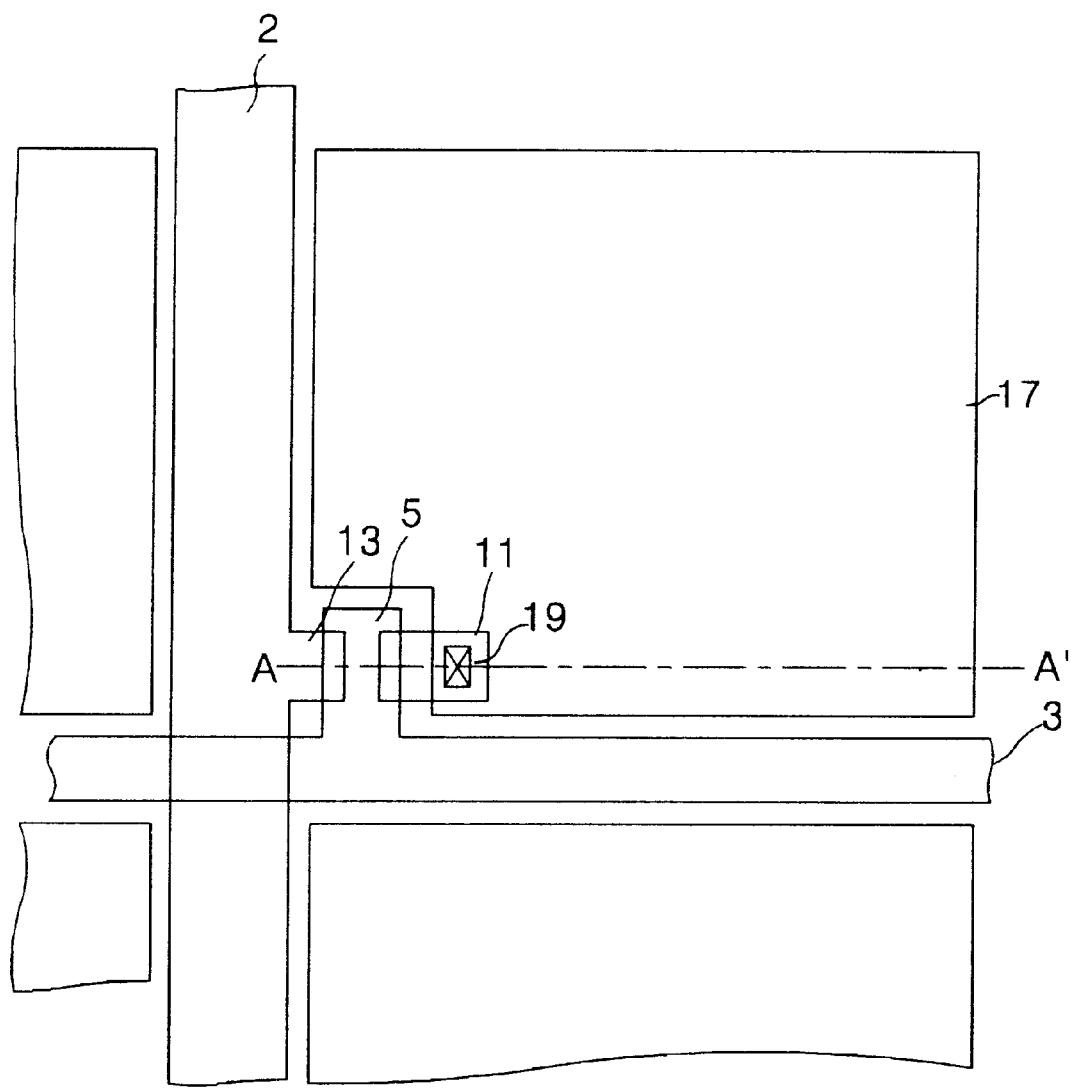
FIG. 1 is a plan view showing a structure of a conventional liquid crystal display device.
Figure 2:
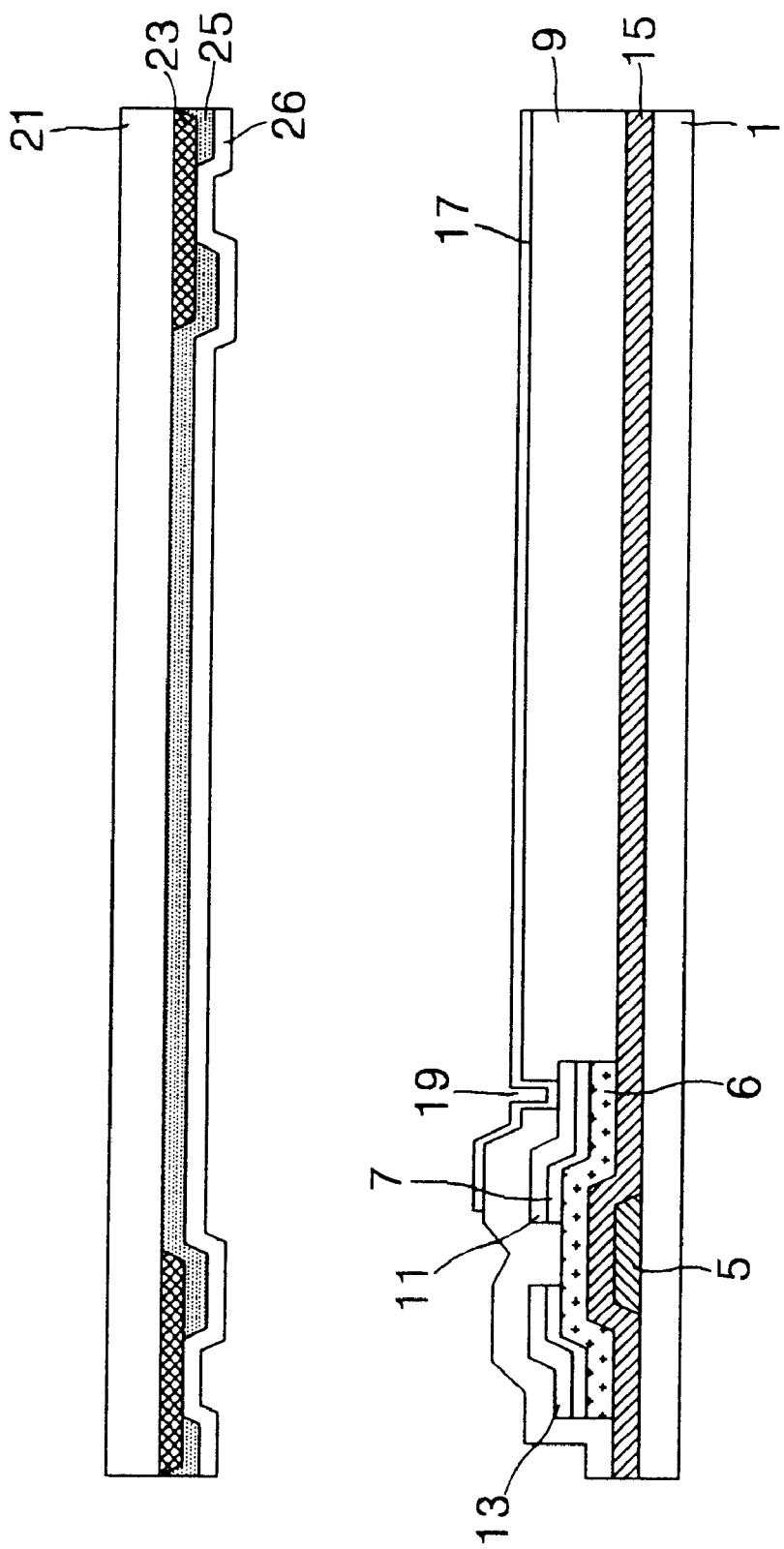
FIG. 2 is a sectional view taken along the A—A' line in FIG. 1.
Figure 3A:
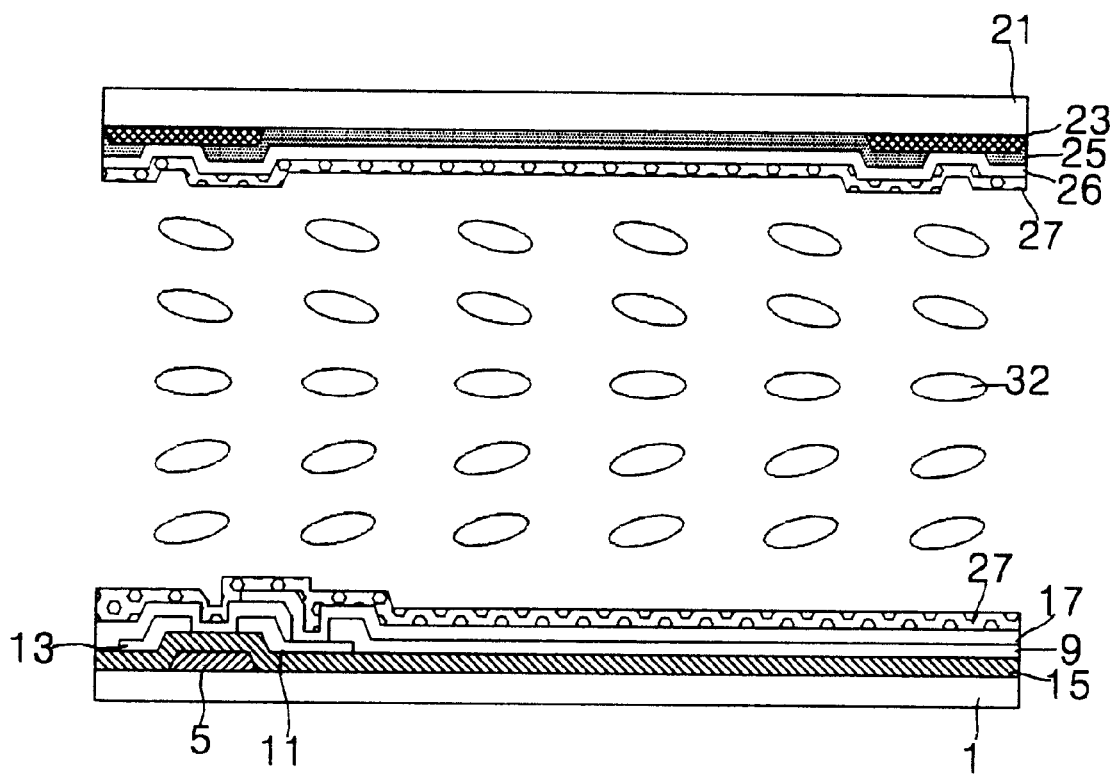
FIG. 3A and FIG. 3B illustrate a driving characteristic of the liquid crystal display device shown in FIG. 2.
Figure 3B:
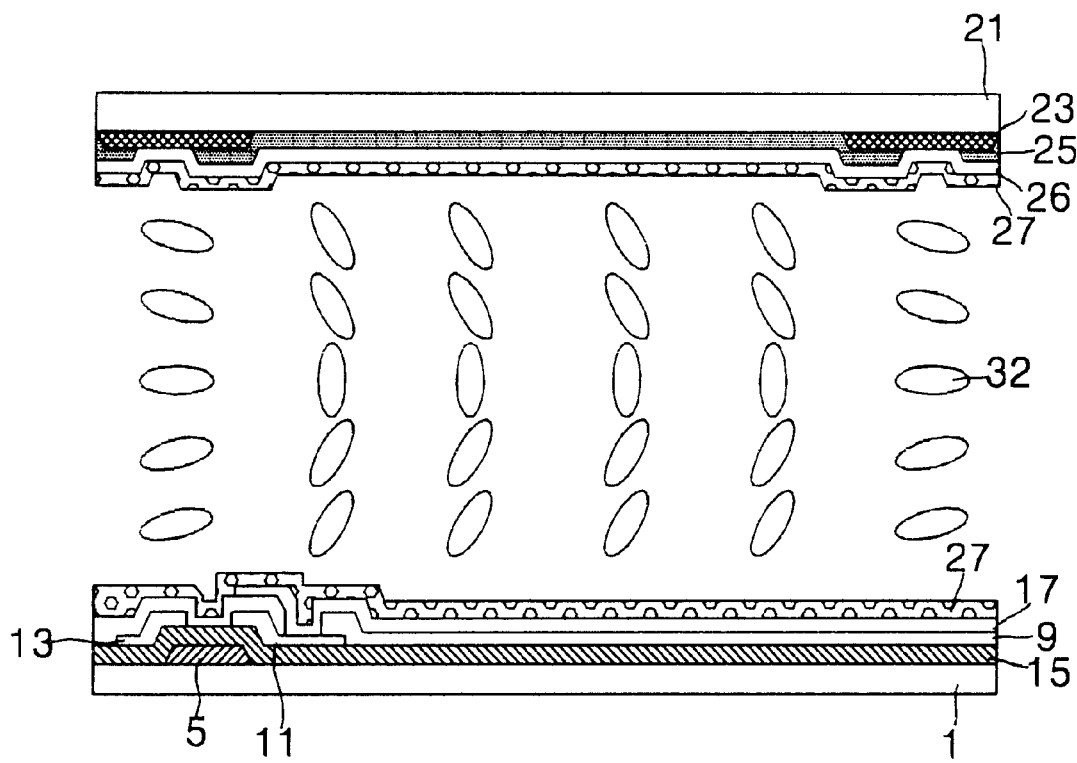

Total energy values when increasing a pre-tilt angle of the liquid crystal within the black matrix in a state of fixing a pre-tilt angle of the liquid crystal within the pixel area as shown in FIG. 1 are given the following table:

TABLE 1

| Pretilt Angle within Black Matrix Area | Total Energy |
|---|---|
| 10 | −2.33 |
| 50 | −2.51 |
| 90 | −2.56 |

In table 1, the total energy represents a stable state within all areas including the black matrix area and the pixel area.

As seen from Table 1, if a pre-tilt angle within the black matrix area is large, the liquid crystal within the black matrix area is easily arranged in a bend state and, simultaneously, the liquid crystal at the pixel area adjacent to the black matrix area is liable to re-arrangement in a stable bend state. In other words, as the liquid crystal within the black matrix area has a larger pre-tilt angle, a total energy of the liquid crystal display device is reduced. Accordingly, the liquid crystal within the pixel area keeps a more stable state.

As a result, the alignment film within the black matrix area is irradiated by an ultraviolet ray and undergoes a rubbing treatment, thereby allowing a pre-tilt angle within the black matrix area to be larger than a pre-tilt angle within the pixel area. Accordingly, upon initialization of the liquid crystal display device, the liquid crystal arranged at a large pre-tilt angle within the black matrix area permits the liquid crystal arranged within the pixel area to be easily arranged in a stable bend structure. Also, the liquid crystal within the pixel area adjacent to the black matrix area having a low transfer of an electric field upon driving is not changed into a splay structure, but is kept at the bend structure, so that a stable bend structure can be obtained.

As described above, according to the present invention, the liquid crystal within the black matrix area is arranged at a large pre-tilt angle upon initialization of the liquid crystal display device, so that a bend structure can be obtained in a fast and stable manner.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A method of fabricating a liquid crystal display device including a non-display area and a display area, comprising:
    rubbing an alignment film positioned at the non-display area and at the display area; and
    exposing the non-display area to light to adjust a pre-tilt angle of a liquid crystal layer included in each of the non-display area and the display area.

2. The method according to claim 1, further comprising:
    arranging a photo mask on the alignment film within the display area excluding the alignment film within the non-display area; and
    exposing the display area and the non-display area to light through the photo mask.

3. The method according to claim 1, wherein the liquid crystal included in the non-display area has a larger pre-tilt angle than the liquid crystal included in the display area.

4. The method according to claim 1, wherein the non-display area is a black matrix.

5. The method according to claim 4, wherein the alignment film on the black matrix is a seed point of the liquid crystal layer.

6. The method according to claim 5, wherein the liquid crystal layer includes a bend structure.

7. A method of forming a liquid crystal display device including a non-display area and a display area comprising:
    forming alignment film on an upper substrate and on a lower substrate, wherein the alignment films are formed by a rubbing;
    arranging a photomask at an upper portion of the upper substrate, and at an upper portion of a lower substrate; and
    irradiating ultraviolet rays onto the alignment films through the photomask, forming an alignment state of the display area to differ from the alignment state of the non-display area.

8. The method according to claim 7, wherein the upper substrate comprises a black matrix, a color filters, and a common electrode.

9. The method according to claim 7, wherein the lower substrate comprises a thin film transistor and a pixel electrode.

10. The method according to claim 9, wherein the thin film transistor comprises gate, source and drain electrodes, and an insulating film.

11. The method according to claim 7, wherein the photomask comprises a photo mask substrate and an opaque metal.

12. The method according to claim 11, wherein the opaque metal corresponds to the display area.

13. The method according to claim 7, wherein the non-display area is a black matrix.

14. The method of according to claim 7, wherein the non-display area is a seed point of the alignment state.

15. The method according to claim 7, further comprising step of forming a liquid crystal layer between the upper and lower substrates.

16. The method according to claim 15, wherein the liquid crystal layer includes a bend structure.

17. A method of fabricating a liquid crystal display device comprising:
   forming a black matrix, a color filter, a common electrode and an alignment film on an upper substrate;
   forming a film transistor, a pixel electrode and an alignment film on a lower substrate;
   arranging a photomask on an upper portion of the upper substrate and on an upper portion of the lower substrate;
   irradiating an ultraviolet ray onto the upper substrate and onto the lower substrate, forming an alignment state of the display area to differ from the alignment state of the non-display area;
   joining the upper substrate and the lower substrate; and
   injecting a liquid crystal layer therebetween.

18. The method according to claim 17, wherein the liquid crystal display comprises a display area and a non-display area.

19. The method according to claim 18, wherein the ultraviolet ray is transmitted onto the non-display area.

20. The method according to claim 17, wherein the liquid crystal layer included in the non-display area has a larger pre-tilt angle than the liquid crystal layer included in the display area.

21. The method according to claim 17, wherein the liquid crystal layer includes a bend structure.

22. The method according to claim 17, wherein the non-display is a black matrix.

23. The method according to claim 17, wherein the non-display area is a seed point of the alignment state.

24. The method according to claim 17, wherein prior to arranging the photomask, the alignment films are subjected to a rubbing treatment.

* * * * *